United States Patent [19]

Spencer et al.

[11] Patent Number: 5,429,659
[45] Date of Patent: Jul. 4, 1995

[54] OXIDATION OF METAL SULFIDES USING THERMOTOLERANT BACTERIA

[75] Inventors: Peter A. Spencer, Bullcreek; Julia R. Budden, Beckenham, both of Australia; Jack Barrett, Kingston, England; Martin N. Hughes, Rickmansworth, England; Robert K. Poole, London, England

[73] Assignee: Bac Tech (Australia) Pty Ltd., Nedlands, Australia

[21] Appl. No.: 119,079

[22] PCT Filed: Mar. 20, 1992

[86] PCT No.: PCT/AU92/00117
§ 371 Date: Nov. 15, 1993
§ 102(e) Date: Nov. 15, 1993

[87] PCT Pub. No.: WO92/16667
PCT Pub. Date: Oct. 1, 1992

[30] Foreign Application Priority Data

Mar. 22, 1991 [AU] Australia .............................. PK5204

[51] Int. Cl.⁶ ............................................. C22B 11/00
[52] U.S. Cl. ................................ 75/711; 423/DIG. 17
[58] Field of Search ................... 75/711; 423/DIG. 17

[56] References Cited

U.S. PATENT DOCUMENTS

| 4,729,788 | 3/1988 | Hutchins et al. | 75/118 R |
| 4,740,243 | 4/1988 | Krebs-Yuill et al. | 75/101 R |
| 4,752,332 | 6/1988 | Wu | 423/DIG. 17 |
| 4,822,413 | 4/1989 | Pooley et al. | 75/118 R |
| 4,987,081 | 1/1991 | Hackl | 423/DIG. 17 |
| 5,030,426 | 7/1991 | Bowers-Irons et al. | 423/98 |
| 5,236,677 | 8/1993 | Torres-Cardona | 423/DIG. 17 |
| 5,244,493 | 9/1993 | Brierley | 423/DIG. 17 |
| 5,246,486 | 9/1993 | Brierley | 423/DIG. 17 |

FOREIGN PATENT DOCUMENTS 5225890 10/1991 Australia .
1122414 4/1982 Canada .

*Primary Examiner*—Peter D. Rosenberg
*Attorney, Agent, or Firm*—Bachman & LaPointe

[57] ABSTRACT

A process for recovering precious or base metals from particulate refractory sulfide materials comprises: a) contacting the sulfide material with an aqueous solution containing a thermotolerant bacteria culture capable of promoting oxidation of the sulfide material at a temperature in the range from 25° to 55° C., b) separating the oxidized residue from the aqueous liquid, and, c) treating the oxidized residue and/or the aqueous liquid to recover metal. In this context, a thermotolerant bacterium is one which has an optimum growth temperature of 40° to 45° C., and an operating temperature of 25° to 55° C.

9 Claims, No Drawings

OXIDATION OF METAL SULFIDES USING THERMOTOLERANT BACTERIA

DESCRIPTION

The present invention relates to a process for the treatment of metal containing materials by bacterial oxidation.

FIELD OF THE INVENTION

It is known that recovery of metals especially precious metals and base metals from refractory sulphide materials can be enhanced by bacterial oxidation or leaching. The bacterial treatment subjects the sulphide material to a pre-oxidation. The refractory sulphide materials can take a wide variety of forms including mineral sulphides, carbonaceous sulphide ores, sulphide flotation concentrates, sulphide gravity concentrates, sulphide tailings, sulphide mattes and sulphidic fume.

The precious metals and some base metals remain in the oxidised solid residue and can be recovered by conventional carbon in pulp or other chemical leaching processes. Some base metals such as copper, zinc and nickel go into solution and may be recovered directly by conventional solvent extraction and electrowinning.

In the past, bacterial oxidation of precious or base metal containing sulphide materials has typically been conducted using bacteria of the Thiobacillus species. However, the Thiobacillus species can only operate at temperatures up to about 40° C. Further, the oxidation effected by Thiobacillus bacteria is an exothermic reaction and it is sometimes necessary to cool the process reactors to prevent the temperature exceeding that at which the Thiobacillus bacteria can operate.

SUMMARY OF THE INVENTION

The present invention provides a process for the bacterial oxidation of metal containing sulphide materials using thermotolerant bacteria which can operate at higher temperatures than conventional Thiobacillus bacteria. In accordance with one aspect of the present invention there is provided a process for recovering metals from particulate refractory precious or base metal containing sulphide materials which comprises contacting the sulphide material with an aqueous solution containing a thermotolerant bacteria culture (as herein defined) capable of promoting oxidation of the sulphide material at a temperature in the range from 25° to 55° C., separating the oxidised residue from the aqueous liquid and treating the oxidised residue and/or the aqueous liquid to recover metal therefrom.

DESCRIPTION OF THE INVENTION

The thermotolerant bacteria used in the present invention are as described in "Thermophiles General, Molecular, and Applied Microbiology" edited by Thomas D. Brock and published by John Wiley & Sons (1986). In Chapter 1 of this publication, there is illustrated in FIG. 1(b) a graph showing that thermotolerant bacteria grow at temperatures lower than those preferred by moderate and obligate or extreme thermophiles.

In the context of the present invention, a thermotolerant bacteria is one which has an optimum growth temperature of 40° to 45° C. and an operating temperature of 25° to 55° C. Preferably, the aqueous solution used in the process of the present invention is acidic. It has been found that the optimum acidity of the aqueous liquid for growth of the thermotolerant bacteria culture used in the present invention is in the range from pH 1.3 to 2.0, whilst the optimum acidity of the aqueous liquid for operation of the process of the present invention is in the range from pH 0.5 to 2.5.

The bacterial oxidation step of the process of the present invention is conducted in the presence of nutrients which are typically dissolved salts of nitrogen, potassium and phosphorus. The nutrients may already be present in the aqueous liquid or they may be added thereto. The nutrient materials promote the growth of the thermotolerant bacteria.

It is preferred that the thermotolerant bacteria be acidophilic in view of the pH conditions under which the process of the present invention is preferably conducted. Further, the thermotolerant bacteria used in the process of the present invention are typically aerobic and thus the aqueous liquid is preferably aerated during the operation of the process to ensure that there is an adequate supply of oxygen for the bacteria. Still further, it is found that the thermotolerant bacteria culture used in the process of the present invention is typically capable of autotrophic growth. Yet further, the thermotolerant bacteria culture typically does not require additional $CO_2$ over and above that normally available from ambient air.

The thermotolerant bacteria culture used in the process of the present invention may be capable of oxidising arsenic (III) to arsenic (V) in acidic aqueous solutions containing soluble iron salts. Further, the thermotolerant bacteria culture used in the process of the present invention may be capable of oxidising iron (II) to iron (III) in acidic aqueous solutions and may be capable of oxidising reduced sulphur species to sulphate ion in acidic aqueous solutions.

Also, the thermotolerant bacteria culture used in the process of the present invention is preferably capable of oxidising iron and sulphides in an aqueous liquid containing up to 20 grams/liter of sodium chloride without the addition of special nutrients or employment of the special conditions. Thus, in this case extracting the pH, temperature, oxygen, nitrogen phosphate and potassium levels are maintained as discussed above, oxidation will proceed.

Typically, a particular culture of thermotolerant bacteria contains one or more bacteria species.

The process of the present invention can be operated in heaps, dumps, agitated systems or dams.

After completion of the oxidation step the oxidised solid residue and the aqueous liquid are typically separated. In the case of precious metal recovery, the oxidised solid residue would preferably be washed and then the pH of the oxidised solid residue adjusted to a level compatible with the use of a cyanide leaching agent. Alternatively, another reagent such as thiourea could be used under acidic conditions and so the need to adjust the pH is obviated.

EXAMPLES

The present invention will now be illustrated by the following examples.

EXAMPLE 1

A pyrite-gold concentrate designated P 1 was treated in accordance with the present invention. The concentrate contained pyrite as the major sulphide mineral with minor amounts of chalcopyrite, sphalerite, galena and arsenopyrite. Other minerals present were quartz, sericite and siderite.

The concentrate had the following assay.

TABLE 1

Assay of Pyrite Concentrate P 1

| Element | Symbol | Assay (by weight) |
| --- | --- | --- |
| Gold | Au | 52.0 ppm |
| Iron | Fe | 26.0% |
| Sulphur | S | 27.5% |
| Nickel | Ni | 113 ppm |
| Copper | Cu | 880 ppm |
| Zinc | Zn | 320 ppm |
| Lead | Pb | 160 ppm |
| Arsenic | As | 3750 ppm |
| Silver | Ag | 8 ppm |

Samples of the concentrate were mixed with a sulphuric acid solution at a pulp density of 3% w/w to provide a pH range of 1.2 to 1.5. Nutrients included in the acid solution were ammonium sulphate at 200 mg/L, di-potassium hydrogen phosphate at 200 mg/L and magnesium sulphate heptahydrate at 400 mg/L.

The acid level (pH) may vary from the start value and may either rise and then fall or fall from the outset. In most tests, the variation can be significant with the final pH often less than 1.0.

The slurry was inoculated with a thermotolerant bacteria culture designated MTC 1. The inoculated slurry was shaken in conical flasks at a temperature of 43° C. Samples were removed periodically and analysed for iron and arsenic extraction to determine the progress of the treatment. The sample was treated by bacterial oxidation for 30 days to achieve 80% oxidation of the pyrite mineral. The solids weight loss due to the oxidation process was 52%. The solid residue was then separated from the residual acid solution. Leaching of the solid residue using alkaline cyanide solution recovered 92% of the gold. In comparison, cyanide leaching could recover only 74% of the gold from the concentrate in the untreated state. These results are summarised in Table 2.

TABLE 2

Gold Recovery from Untreated and Oxidised Concentrate

| Sample | Iron Extracted (by weight) | Gold Recovered By Cyanide Leaching (by weight) |
| --- | --- | --- |
| Untreated | 0% | 74% |
| Bacterial Oxidation | 80% | 92% |

The cyanide solution employed to recover the gold contained sodium cyanide at a concentration of 2 g/L. The iron in the solution from the bacterial oxidation process can be removed by adjusting the pH to above 5.0 by the addition of lime, limestone, alkaline tailings or sodium hydroxide.

The results of this test show that gold encapsulated with pyrite (FeS) can be released from the sulphide lattice by at least partial oxidation of the sulphur and iron by the thermotolerant bacteria culture MTC 1 to render the gold accessible to cyanide solution.

EXAMPLE 2

A nickel sulphide ore designated N 1 was treated in accordance with the present invention. The ore contained both sulphidic nickel and non-sulphidic nickel minerals including violarite, lizardite and niccolite (NiAs). Approximately 70% of the nickel was present as sulphidic nickel. Other minerals were siderite, goethite, pyrite, chlorite and quartz.

The ore had the following assay.

TABLE 3

Assay of Nickel Ore N 1

| Element | Symbol | Assay (by weight) |
| --- | --- | --- |
| Nickel | Ni | 2.74% |
| Iron | Fe | 18.7% |

Samples of the ore were mixed with a sulphuric acid solution at a pulp density of 13% w/w to provide a pH range of 1.2 to 1.5. Nutrients included in the acid solution were ammonium sulphate am 200 mg/L, di-potassium hydrogen phosphate at 200 mg/L and magnesium sulphate heptahydrate at 400 mg/L.

The acid level (pH) may vary from the start value and may either rise and then fall or fall from the outset. In most tests, the variation can be significant with the final pH often less than 1.0.

The slurry was inoculated with the thermotolerant bacteria culture designated MTC 1. The inoculated slurry was shaken in conical flasks at a temperature of 47° C. Samples were removed periodically and analysed for iron and nickel extraction to determine the progress of the treatment. At the completion of the bacterial oxidation treatment, 17 days, the solution was removed from the residual solids and the residual solids washed with sulphuric acid solution to remove any residual nickel. The nickel recovery was 93% after the residual nickel was washed out of the solids residue.

The nickel could be recovered from the solution by raising the pH to a value of about 8.5, by the addition of lime or sodium hydroxide.

For comparison, the ore was also treated with iron (III) sulphate solution at pH 1.0 and 50° C. for 24 hours to extract nickel. Only 16% of the nickel was recovered in this process. These results are summarized in Table 4.

TABLE 4

Nickel Recovery from Ore N 1

| Treatment Method | Nickel in Residue (by weight) | Nickel Extraction (by weight) |
| --- | --- | --- |
| Iron (III) Leaching | 2.03% | 16% |
| Bacterial Oxidation | 0.60% | 78% |
| Bacterial Oxidation & Washing | 0.19% | 93% |

The results of this test showed that base metals in ore as sulphide minerals can be recovered by the action of the thermotolerant bacteria culture MTC 1. The sulphidic minerals were oxidised to release the nickel into the acidic solution for conventional recovery.

EXAMPLE 3

A gold bearing arsenopyrite-pyrite concentrate was treated according to the present invention, This concentrate was designated AP 1. The major sulphide minerals were pyrite, 30% by weight and arsenopyrite, 35% by weight. Other minerals present were calcite, quartz and chlorite. The gold was present almost completely in the arsenopyrite.

The concentrate had the following assay.

TABLE 5

| Assay of Arsenopyrite Concentrate AP 1 | | |
|---|---|---|
| Element | Symbol | Assay (by weight) |
| Gold | Au | 80 ppm |
| Arsenic | As | 16.7% |
| Iron | Fe | 28.1% |
| Sulphur | S | 30.0% |
| Nickel | Ni | 1.5% |

Samples of the concentrate were mixed with a sulphuric acid solution at a pulp density of 3% w/w to provide a pH range of 1.0 to 1.3. Nutrients included in the acid solution were ammonium sulphate at 200 mg/L, dipotassium hydrogen phosphate at 400 mg/L and magnesium sulphate heptahydrate at 400 mg/L.

The acid level (pH) may vary from the start value and may either rise and then fall or fall from the outset. In most tests, the variation can be significant with the final pH often less than 1.0.

The slurry was inoculated with the thermotolerant bacteria culture designated MTC 1. The inoculate slurry was shaken in conical flasks at a temperature of 40° C. Samples were removed periodically and analysed for iron and arsenic extraction to determine the progress of the treatment. The sample was treated by bacterial oxidation for 12 days to achieve 90% break down of the arsenopyrite mineral. The solids weight loss due to the oxidation process was 30%. The residual solids were then separated from the acid solution. Leaching of the separated solid residue using alkaline cyanide solution recovered 95% of the gold. In comparison, cyanide leaching could recover only 21% of the gold from the concentrate in the untreated state. These results are summarised in Table 6.

TABLE 6

| Gold Recovery from Untreated and Oxidised Concentrate | | |
|---|---|---|
| Sample | Arsenic Extracted (by weight) | Gold Recovered by Cyanide Leaching (by weight) |
| Untreated | 0% | 21 |
| Bacterial Oxidation | 90% | 95 |

The cyanide solution employed to recover the gold contained sodium cyanide at a concentration of 2 g/L. The arsenic and iron in the solution from the bacterial oxidation process can be removed by adjusting the pH to above 5.0 by the addition of lime, limestone, alkaline tailings or sodium hydroxide.

The results of this test show that gold encapsulated with arsenopyrite (FeAsS) can be released from the sulphide lattice by at least partial oxidation of the arsenic, sulphur and iron by the thermotolerant bacteria culture MTC 1 to render the gold accessible to cyanide solution.

EXAMPLE 4

A gold bearing arsenopyrite-pyrite concentrate was treated according to the present invention. This concentrate was designated AP 2. The major sulphide minerals were pyrite, 90% by weight and arsenopyrite 9% by weight. Other minerals present were calcite, quartz and chlorite. The gold was distributed in both the arsenopyrite and the pyrite.

The concentrate-had the following assay.

TABLE 7

| Assay of Arsenopyrite - Pyrite Concentrate AP 2 | | |
|---|---|---|
| Element | Symbol | Assay (by weight) |
| Gold | Au | 54 ppm |
| Arsenic | As | 4.2% |
| Iron | Fe | 35.7% |
| Sulphur | S | 40.0% |

Samples of the concentrate were mixed with a sulphuric acid solution at a pulp density of 10% w/w to provide a pH range of 1.0 to 1.3. Nutrients included in the acid solution were ammonium sulphate at 200 mg/L, dipotassium hydrogen phosphate at 400 mg/L and magnesium sulphate heptahydrate at 400 mg/L.

The acid level (pH) may vary from the start value and may either rise and then fall or fall from the outset. In most tests, the variation can be significant with the final pH often less than 1.0.

The slurry was inoculated with the thermotolerant bacteria culture designated MTC 1. The inoculated slurry was shaken in conical flasks at a temperature of 53° C. Samples were removed periodically and analysed for iron and arsenic extraction to determine the progress of the treatment. The sample was treated by bacterial oxidation for 12 days to achieve 90% oxidation of the arsenopyrite mineral and an additional 21 days for 70% pyrite oxidation as well as arsenopyrite oxidation. The weight loss due to the oxidation process was 25% for the arsenopyrite and 78% for the 100% arsenopyrite plus 70% pyrite. The solids residue was then separated from the acid solution.

Leaching of the solid residue using alkaline cyanide solution recovered 79% of gold for the oxidation of 90% arsenopyrite and 87% for complete oxidation of the arsenopyrite and 70% of the pyrite in comparison, cyanide leaching could recover only 53% of the gold from the concentrate in the uncreated state. These results are summarised in Table 8.

TABLE 8

| Gold Recovery from Untreated and Oxidised Concentrate | | | |
|---|---|---|---|
| Sample | Arsenic Extracted (by weight) | Iron Extracted (by weight) | % Gold Recovered (by weight) |
| Untreated | 0% | 0% | 53% |
| Bacterial Oxidation | 90% | 25% | 79% |
| Bacterial Oxidation | 100% | 70% | 87% |

The cyanide solution employed to recover the gold contained sodium cyanide at a concentration of 2 g/L.

The arsenic and iron in the solution from the bacterial oxidation process can be removed by adjusting the pH to above 5.0 by the addition of lime, limestone, alkaline tailings or sodium hydroxide.

The results of this test show that gold encapsulated with arsenopyrite (FeAsS) and in pyrite (FeS2) can be released from the sulphide lattice by at least partial oxidation of The arsenic, sulphur and iron by the thermotolerant bacteria culture MTC 1 to render the gold accessible cyanide solution. This example also shows that the MTC 1 culture is able to operate according to the invention at 53° C.

The thermotolerant bacteria culture MTC 1 was isolated from a coal mine in Western Australia. Sludge and water samples were taken and used to inoculate volumes of a modified 9K medium containing yeast extract. The samples were incubated at 30° C., growth was observed after 7 days. These samples were then sub cultured in modified 9K medium without yeast extract.

Modifications and variations such as would be apparent to a skilled addressee are deemed within the scope of the present invention.

We claim:

1. A process for recovering metals from particulate refractory precious or base metal containing sulphide material comprising the steps of contacting the sulphide material with an aqueous solution at a temperature in the range from 25° to 55° C., the aqueous solution containing a thermotolerant bacteria culture having an optimum growth temperature of 40° to 45° C. and capable of promoting oxidation of the sulphide material at a temperature in the range from 25° to 55° C., separating the oxidized residue from the aqueous liquid and treating a substance selected from a group consisting of the oxidized residue and the aqueous liquid, to recover metal therefrom.

2. A processing according to claim 1, wherein the aqueous solution is acidic.

3. A process according to claim 2, wherein the aqueous solution has a pH in the range from 0.5 to 2.5.

4. A process according to claim 1, wherein the thermotolerant bacteria is acidophilic.

5. A process according to claim 1, wherein the thermotolerant bacteria is aerobic.

6. A process according to claim 5, wherein the aqueous liquid is aerated during the operation of the process.

7. A process according to claim 1, wherein the thermotolerant bacteria is capable of autotrophic growth.

8. A process according to claim 1, wherein no $CO_2$ is supplied to the thermotolerant bacteria during the operation of the process other than that available from ambient air.

9. A process according to claim 1, wherein the aqueous liquid contains sodium chloride in an amount up to 20 grams per liter.

* * * * *